(12) United States Patent
Marotta

(10) Patent No.: US 6,374,765 B1
(45) Date of Patent: Apr. 23, 2002

(54) DEVICE FOR DETERMINING AMOUNT OF DEPLOYMENT OF AN ANCHOR FROM A ROPE COMPARTMENT HAVING AN ANCHOR LINE THROUGH HOLE

(76) Inventor: Charles P. Marotta, 280 Surburban Ave. Unit G, Deer Park, NY (US) 11729

( * ) Notice: Subject to any disclaimer, the term of this patent is extended or adjusted under 35 U.S.C. 154(b) by 0 days.

(21) Appl. No.: 09/662,768

(22) Filed: Sep. 15, 2000

(51) Int. Cl.⁷ .............................................. B63B 21/24
(52) U.S. Cl. ...................................... 114/293
(58) Field of Search .................... 114/230.1, 221 R, 114/293, 294

(56) References Cited

U.S. PATENT DOCUMENTS

| | | | |
|---|---|---|---|
| 4,697,758 A | 10/1987 | Hirose et al. | 242/84.1 M |
| 4,856,450 A | * 8/1989 | Lubahn | 114/293 |
| 4,912,464 A | 3/1990 | Bachman | 340/850 |
| 5,445,103 A | 8/1995 | Bleth et al. | 114/293 |
| 5,803,008 A | 9/1998 | Georgens et al. | 114/293 |
| 5,932,815 A | 8/1999 | Dodds | 73/862.393 |

* cited by examiner

Primary Examiner—Stephen Avila
(74) Attorney, Agent, or Firm—Richard L. Miller

(57) ABSTRACT

A device for determining amount of deployment of an anchor that includes a sensor assembly, an anchor line, a detector/pulse module, and a digital counter/readout display. The sensor assembly includes a coil assembly that contains metal detecting coils. The anchor line contains a plurality of pairs of pins that are spaced-apart from each other, are in alignment with each other, and cooperate with the metal detecting coils, wherein each pin of each pair of pins is perpendicularly crossed to each other, engage each other, and extend diametrically in the anchor line. The detector/pulse module has an input jack, an output jack, an LED, and an on/off switch. The digital counter/readout display includes a digital display, an automatic sleep mode/wake button, a power/reset ganged button, a fuse, a power jack, and a data jack. The device further includes a metal detector circuit that includes a tuner circuit, and an amplifier pulse shaper. The device further includes a counter circuit that includes a pulse counter, a filtered regulator power supply that has a 12V output and a 5V output, a decoder driver, and a sleep timer.

38 Claims, 8 Drawing Sheets

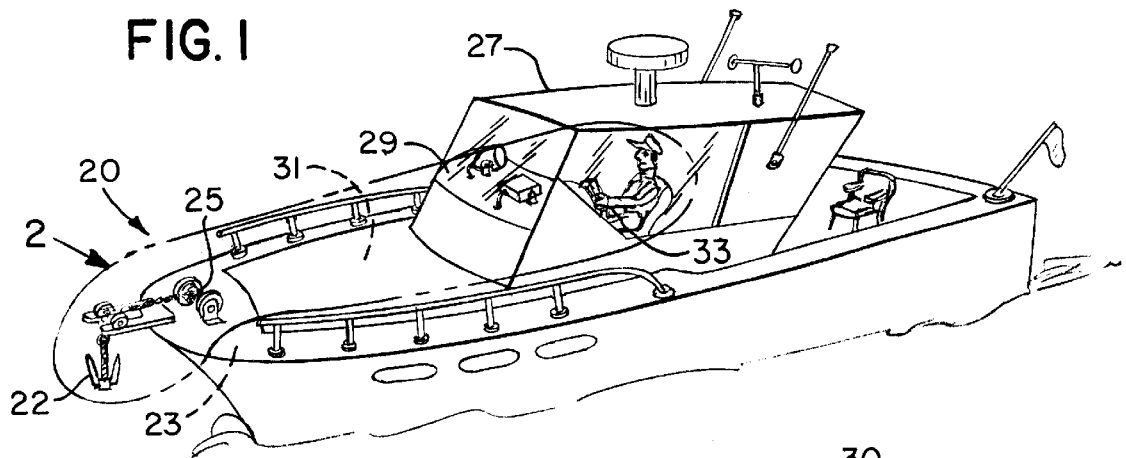
FIG. 1
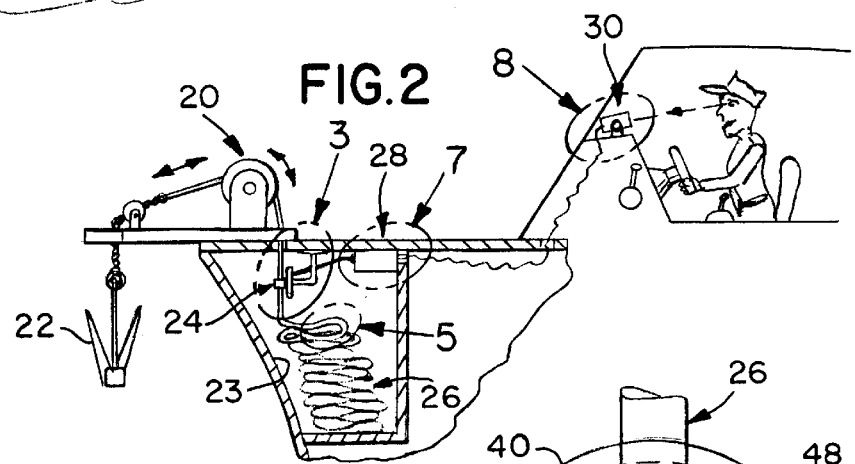
FIG. 2
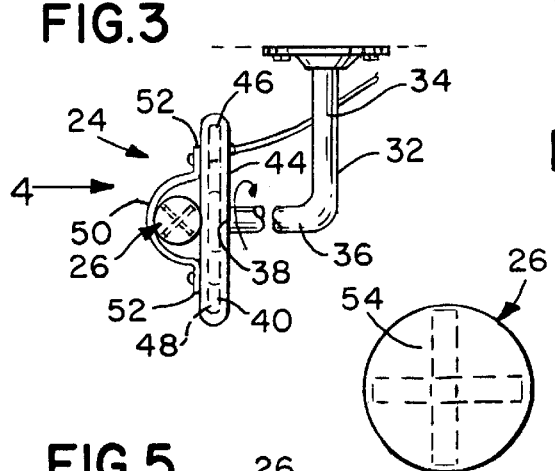
FIG. 3
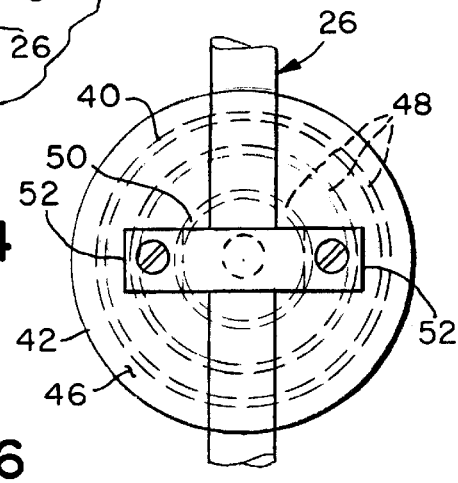
FIG. 4
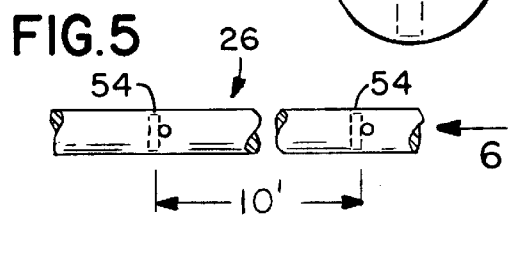
FIG. 5
FIG. 6
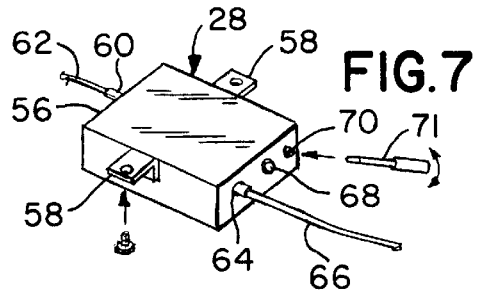
FIG. 7

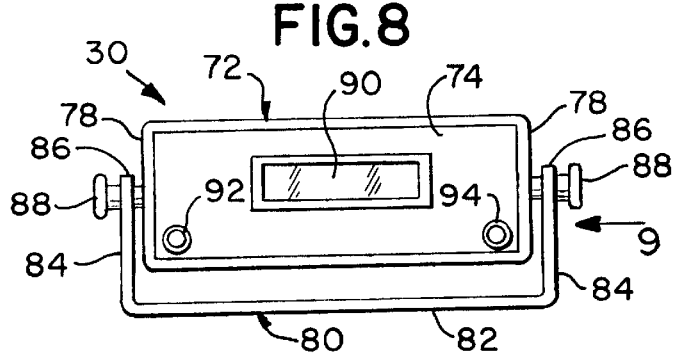
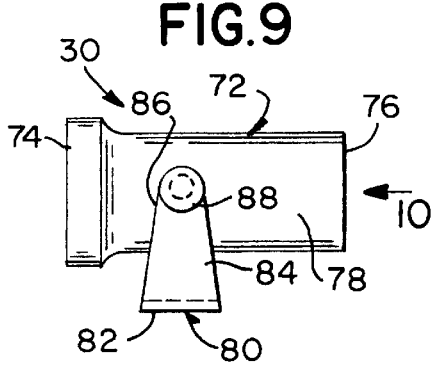
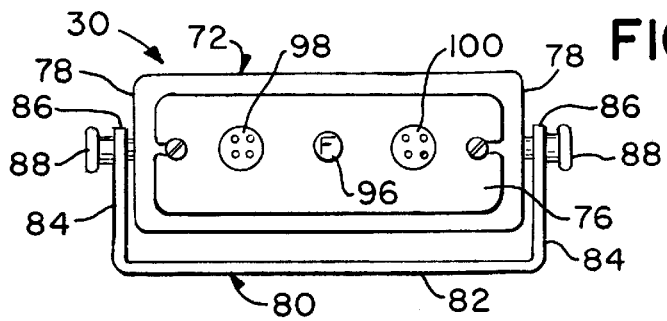
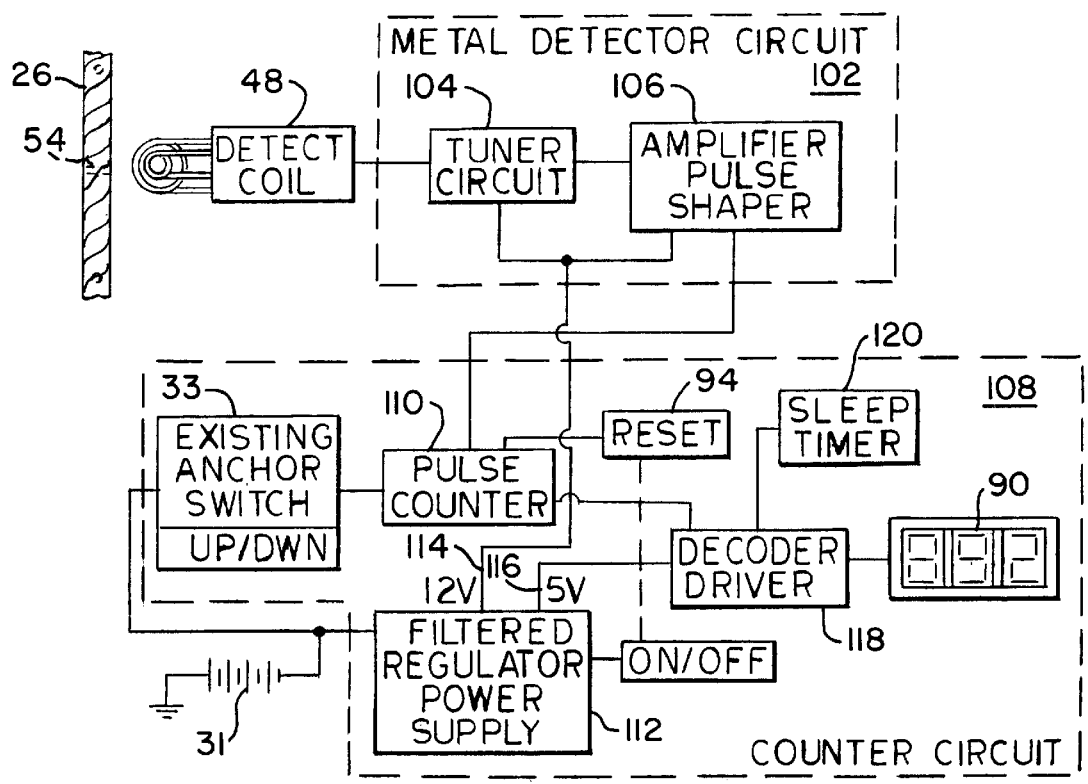

DEVICE FOR DETERMINING AMOUNT OF DEPLOYMENT OF AN ANCHOR FROM A ROPE COMPARTMENT HAVING AN ANCHOR LINE THROUGH HOLE

BACKGROUND OF THE INVENTION

1. Field of the Invention

The present invention relates to a device. More particularly, the present invention relates to a device for determining amount of deployment of an anchor from a rope compartment having an anchor line through hole.

2. Description of the Prior Art

Numerous innovations for water related devices have been provided in the prior art that will be described. Even though these innovations may be suitable for the specific individual purposes to which they address, however, they differ from the present invention.

A first example, U.S. Pat. No. 4,697,758 to Hirose et al. teaches a fishing reel having a rotatable spool for winding thereon a fishing line, a Hall-effect sensor for detecting the spool rotation, and a microcomputer including an up/down counter for receiving signals from the sensor to count the number of spool revolutions during paying out and winding up of the fishing line. Calculation is provided by the microcomputer for determining the lengths of the paid out portion and the wound up portion of the fishing line with there being a display unit for displaying the calculated lengths. A memory associated with the microcomputer provides for selection from one of a plurality of formulas for calculation of line lengths corresponding to various line diameters. A control is provided for resetting the displayed value to 0 when the line is completely wound up.

A second example, U.S. Pat. No. 4,912,464 to Bachman teaches a motion detector that is physically attached to a boat's anchor. Upon abnormal motion or movement of the anchor, indicative of a dragging anchor, a pulse generator is initiated by the motion detector to actuate a transmitting transducer and generate an acoustic or sonar wave in the water. The acoustic wave is sensed by a receiving transducer on the boat, and a warning alarm is produced. In a preferred embodiment, the receiving transducer actuates an RF transmitter which generates a radio wave, and an RF receiver which is tuned to receive the radio wave actuates the alarm.

A third example, U.S. Pat. No. 5,445,103 to Bleth et al. teaches an anchor drift warning system that includes an anchor indicating buoy and a reference buoy. Each buoy includes a floating housing, a light, a battery, solar powered battery recharger, and a spool. Radio signaling apparatus may be included to provide alarm indication aboard the vessel. A line retractably held in the spool of the indicating buoy is attached to the main anchor of the vessel. A line retractably held in the spool of the reference buoy is attached to its own anchor or to a weight. Both buoys are stowed proximate the anchor, and discharged into the water when the vessel main anchor is deployed. The reference buoy is substantially immobile upon deployment. The indicating buoy will move with the anchor, if the anchor has failed to be immobilized by solid engagement with the water bottom. Visual indication of this condition is provided by increasing distance between the indicating buoy and the reference buoy.

A fourth example, U.S. Pat. No. 5,803,008 to Georgens et al. teaches a system for monitoring and controlling the length of anchor rode comprises a winch, a sensor assembly associated with the winch and a control circuit connected to the sensor and the winch. The winch is mounted on a vessel and has a rotatable element about which a length of anchor rode is at least partially wrapped. The sensor assembly is mounted adjacent the rotatable element for generating signals representative of the amount and direction of rotation of the rotatable element. The winch is controllable to rotate the rotatable element in a first direction, either in a powered fashion or through free fall, for letting out the anchor rode from the vessel to lower the anchor. The winch is also controllable to rotate the rotatable element in a second direction for pulling the anchor rode into the vessel to raise the anchor. The control circuit is connected to the winch for causing the rotatable element to rotate in the first and second directions and is also connected to the sensor assembly for determining a length and direction of anchor rode deployed from the winch utilizing the signals from the sensor assembly.

A fifth example, U.S. Pat. No. 5,932,815 to Dodds teaches a monitoring system that measures the tensile load on a ship's rode (the cable, chain or rope connecting the ship to its anchor) and also measures the velocity and direction of the wind and the velocity of the current that produce the rode load. From those measured values, the system calculates wind and current resistance factors enabling it to model rode load as a function of wind and current velocity. When the behavior of the monitored rode load departs from the behavior predicted by the model in a manner that is symptomatic of a catastrophic or dragging anchor system failure, the anchor monitoring system signals an alarm. An alarm is also produced if the rode load approaches the tensile strength of the rode. The system also tests the anchor holding strength of the sea bed and provides anchor load information helpful to a skipper when motoring into the wind. The monitoring system senses rode load by using a load cell to laterally deflect the rode. The load cell includes a strain gauge generating a output signal that may be processed to determine the rode's, or any other lining like mooring lines, running rigging, etc., tensile load.

It is apparent that numerous innovations for water related devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, an object of the present invention is to provide a device for determining amount of deployment of an anchor from a rope compartment having an anchor line through hole that avoids the disadvantages of the prior art.

Another object of the present invention is to provide a device for determining amount of deployment of an anchor from a rope compartment having an anchor line through hole that is simple and inexpensive to manufacture.

Still another object of the present invention is to provide a device for determining amount of deployment of an anchor from a rope compartment having an anchor line through hole that is simple to use.

Briefly stated, yet another object of the present invention is to provide a device for determining amount of deployment of an anchor that includes a sensor assembly, an anchor line, a detector/pulse module, and a digital counter/readout display. The sensor assembly includes a coil assembly that contains metal detecting coils. The anchor line contains a plurality of pairs of pins that are spaced-apart from each other, are in alignment with each other, and cooperate with the metal detecting coils, wherein each pin of each pair of pins is perpendicularly crossed to each other and engage each other and extend diametrically in the anchor line. The detector/pulse module has an input jack, an output jack, an LED, and an on/off switch. The digital counter/readout display includes a digital display, an automatic sleep mode/ wake button, a power/reset ganged button, a fuse, a power jack, and a data jack. The device further includes a metal detector circuit that includes a tuner circuit, and an amplifier pulse shaper. The device further includes a counter circuit that includes a pulse counter, a filtered regulator power supply that has a 12V output and a 5V output, a decoder driver, and a sleep timer.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the present invention in use;

FIG. 2 is an enlarged diagrammatic side elevational view, in partial section, of the area generally enclosed by the dotted curve identified by arrow 2 in FIG. 1 of the present invention;

FIG. 3 is an enlarged diagrammatic side elevational view of the area generally enclosed by the dotted curve identified by arrow 3 in FIG. 2 of the sensor coil assembly of the present invention;

FIG. 4 is an enlarged diagrammatic front elevational view taken in the direction of arrow 4 in FIG. 3;

FIG. 5 is an enlarged diagrammatic side elevational view of the area generally enclosed by the dotted curve identified by arrow 5 in FIG. 2 of a portion of the anchor line of the present invention;

FIG. 6 is an enlarged diagrammatic end view taken generally in the direction of arrow 6 in FIG. 5;

FIG. 7 is an enlarged diagrammatic perspective view of the area generally enclosed by the dotted curve identified by arrow 7 in FIG. 2 of the detector/pulse module of the present invention;

FIG. 8 is an enlarged diagrammatic front elevational view of the area generally enclosed by the dotted curve identified by arrow 8 in FIG. 2 of the digital counter/readout display of the present invention;

FIG. 9 is a diagrammatic side elevational view taken generally in the direction of arrow 9 in FIG. 8;

FIG. 10 is a diagrammatic rear elevational view taken generally in the direction of arrow 10 in FIG. 9;

FIG. 11 is a block diagram of the present invention; and

LIST OF REFERENCE NUMERALS UTILIZED IN THE DRAWING

Figure 12A:
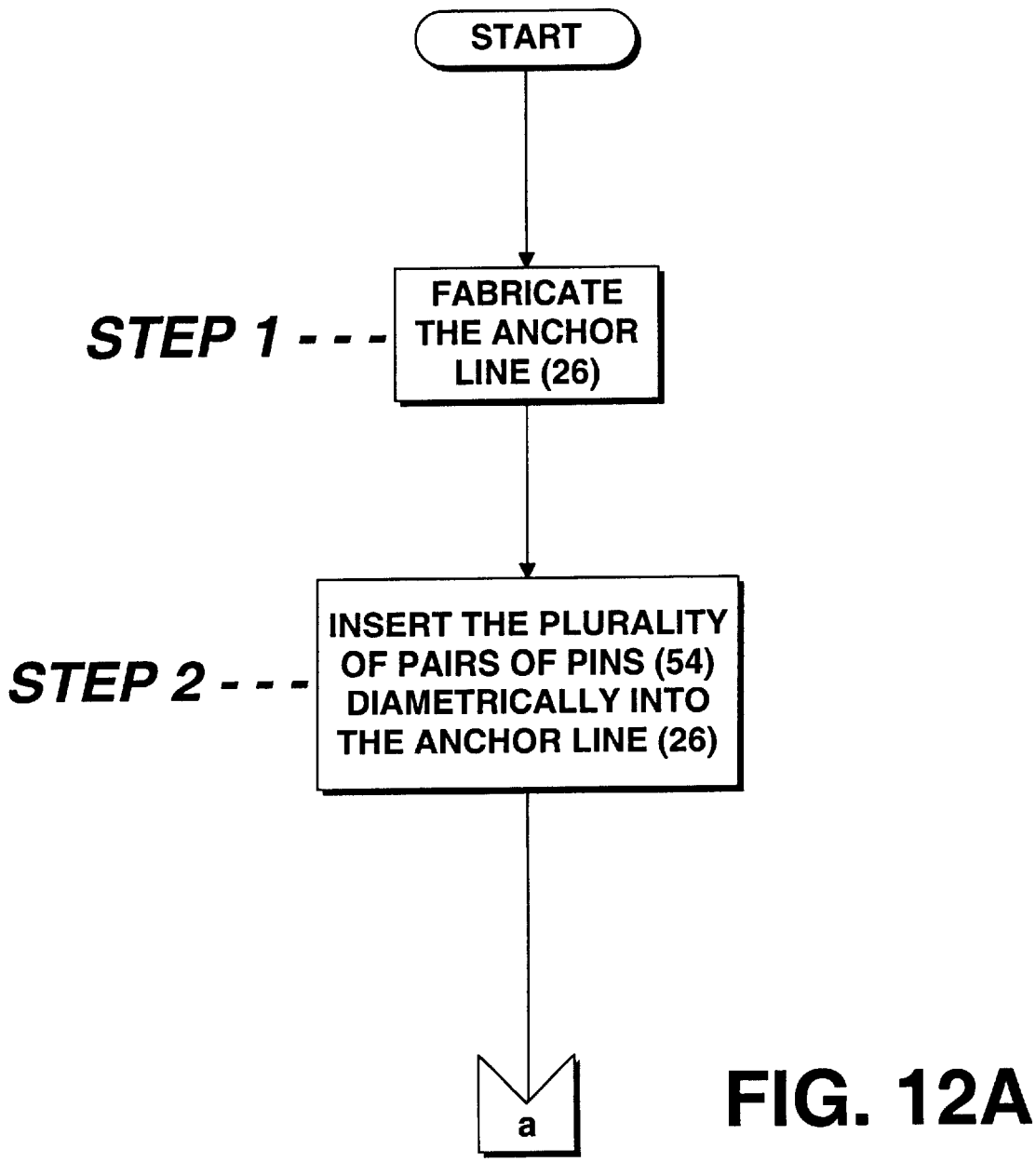
FIGS. 12A–12F are a flow chart for utilizing the present invention.

Overall 20 device of present invention for determining amount of deployment of anchor 22 from rope compartment 23 having an anchor line through hole 25

22 anchor
23 rope compartment in boat 27
24 sensor assembly
25 anchor line through hole in rope compartment 23
26 anchor line for attaching to anchor 22
27 boat
28 detector/pulse module
29 dashboard of boat 27
30 digital counter/readout display
31 power supply of boat 27
33 up/down anchor switch of boat 27

Sensor Assembly 24

32 bracket of sensor assembly 24 for fixedly attaching in rope compartment 23, directly under anchor line through hole 25 in rope compartment 23
34 first portion of bracket 32 of sensor assembly 24 for depending vertically into rope compartment 23, directly under anchor line through hole 25 in rope compartment 23
36 second portion of bracket 32 of sensor assembly 24
38 terminal end of second portion 36 of bracket 32 of sensor assembly 24
40 coil assembly of sensor assembly 24
42 plate of coil assembly 40 of sensor assembly 24
44 rearwardly-facing surface of plate 42 of coil assembly 40 of sensor assembly 24
46 forwardly-facing surface of plate 42 of coil assembly 40 of sensor assembly 24
48 metal detecting coils contained in plate 42 of coil assembly 40 of sensor assembly 24
49 tuned field generated by metal detecting coils 48 contained in plate 42 of coil assembly 40 of sensor assembly 24
50 rope ring of sensor assembly 24
52 ends of rope ring 50 of sensor assembly 24

Anchor Line 26

54 plurality of pairs of pins contained in anchor line 26

Detector/Pulse Module 28

56 housing of detector/pulse module 28
58 pair of tabs of housing 56 of detector/pulse module 28 for mounting in rope compartment 23, in proximity to sensor assembly 24
60 input jack on housing 56 of detector/pulse module 28
62 coiled cord in input jack 60 on housing 56 of detector/ pulse module 28
64 output jack on housing 56 of detector/pulse module 28
66 cable in output jack 64 on housing 56 of detector/pulse module 28 for carrying power in and pulses out
68 LED on housing 56 of detector/pulse module 28
70 on/off switch on housing 56 of detector/pulse module 28 for being activated by being turned by small screw driver 71, until LED 68 illuminates
71 small screw driver

Digital Counter/Readout Display 30

72 housing of digital counter/readout display 30
74 face plate of housing 72 of digital counter/readout display 30
76 rear wall of housing 72 of digital counter/readout display 30
78 pair of side walls of housing 72 of digital counter/readout display 30
80 bracket of digital counter/readout display 30 for fixedly mounting to dashboard 29 of boat 27

82 floor of bracket 80 of digital counter/readout display 30 for fixedly mounting to dashboard 29 of boat 27
84 pair of side walls of bracket 80 of digital counter/readout display 30
86 terminal ends of pair of side walls 84 of bracket 80 of digital counter/readout display 30
88 pair of thumb screws of digital counter/readout display 30
90 digital display of digital counter/readout display 30
92 automatic sleep mode/wake button of digital counter/readout display 30
94 power/reset ganged button of digital counter/readout display 30
96 fuse of digital counter/readout display 30
98 power jack of digital counter/readout display 30 for electrically communicating with power supply 31 of boat 27
100 data jack of digital counter/readout display 30

Circuitry 102 metal detector circuit
104 tuner circuit of metal detector circuit 102
106 amplifier pulse shaper of metal detector circuit 102
108 counter circuit
110 pulse counter of counter circuit 108 for electrically communicating with up/down anchor switch 33 of boat 27
112 filtered regulator power supply for electrically communicating with power supply 31 of boat 27
114 12V output of filtered regulator power supply
116 5V output of filtered regulator power supply
118 decoder driver of counter circuit 108
120 sleep timer of counter circuit 108

Method of Using Device 20

122 awl
124 needle nose pliers
126 glue
128 tuned field
130 analog wave
132 digital pulse

DETAILED DESCRIPTION OF THE PREFERRED EMBODIMENT

Referring now to the figures, in which like numerals indicate like parts, and particularly to FIG. 1, the device of the present invention is shown generally at 20 for determining amount of deployment of an anchor 22 from a rope compartment 23 having an anchor line through hole 25 on a boat 27 having a dashboard 29, a power supply 31, and an up/down anchor switch 33 in electrical communication with the power supply 31.

The overall configuration of the device 20 can best be seen in FIG. 2, and as such, will be discussed with reference thereto.

The device comprises a sensor assembly 24, an anchor line 26 that operatively cooperates with the sensor assembly 24 for attaching to the anchor 22, a detector/pulse module 28 that is in electrical communication with the sensor assembly 24, and a digital counter/readout display 30 that is in electrical communication with the detector/pulse module 28.

The specific configuration of the sensor assembly 24 can best be seen in FIGS. 3 and 4, and as such, will be discussed with reference thereto.

The sensor assembly 24 comprises a bracket 32 for fixedly attaching in the rope compartment 23, directly under the anchor line through hole 25.

The bracket 32 of the sensor assembly 24 is L-shaped and has a first portion 34 for depending vertically into the rope compartment 23, directly under the anchor line through hole 25, and a second portion 36 that extends forwardly and horizontally from the first portion 34 thereof, to a terminal end 38.

The sensor assembly 24 further comprises a coil assembly 40 that includes a plate 42 that is vertically-oriented, disk-shaped, and has a rearwardly-facing surface 44 and a forwardly-facing surface 46, and contains metal detecting coils 48 that are concentrically disposed therein and generate a tuned field 49.

The rearwardly-facing surface 44 of the plate 42 is disposed centrally on the terminal end 38 of the horizontal portion 36 of the bracket 32 of the sensor assembly 24, and is oriented perpendicular thereto.

The sensor assembly 24 further comprises a rope ring 50 that is a horizontally-oriented band that extends diametrically across the forwardly-facing surface 46 of the plate 42, and has only ends 52 affixed thereto so as to allow the anchor line 26 to be fed vertically and freely therethrough.

The specific configuration of the anchor line 26 can best be seen in FIGS. 5 and 6, and as such, will be discussed with reference thereto.

The anchor line 26 contains a plurality of pairs of pins 54 that are spaced 10' apart from each other, are in alignment with each other, and cooperate with the metal detecting coils 48 of the sensor assembly 24.

Each pin of each pair of pins 54 is perpendicularly crossed to each other, engage each other, and extend diametrically in the anchor line 26.

Each pin of each pair of pins 54 is made of either a fine ferric material or gold.

The specific configuration of the detector/pulse module 28 can best be seen in FIG. 7, and as such, will be discussed with reference thereto.

The detector/pulse module 28 has a housing 56 with a pair of tabs 58 for mounting in the rope compartment 23, in proximity to the sensor assembly 24.

The detector/pulse module 28 has an input jack 60 that is mounted on the housing 56 thereof, and is in electrical communication with the sensor assembly 24, by a coiled cord 62.

The detector/pulse module 28 further has an output jack 64 that is mounted on the housing 56 thereof, and is in electrical communication with the digital counter/readout display 30, by a cable 66 for carrying power in and pulses out.

The detector/pulse module 28 further has an LED 68 that is mounted on the housing 56 thereof.

The detector/pulse module 28 further has an on/off switch 70 that is mounted on the housing 56 thereof, and is in electrical with the LED 68 for being activated by being turned by a small screw driver 71, until the LED 68 illuminates.

The specific configuration for the digital counter/readout display 30 can best be seen in FIGS. 8–10, and as such, will be discussed with reference thereto.

The digital counter/readout display 30 comprises a housing 72 that has a face plate 74, a rear wall 76, and a pair of side walls 78.

The digital counter/readout display 30 further comprises a bracket 80 for fixedly mounting to the dashboard 29 of the boat 27.

The bracket 80 of the digital counter/readout display 30 is U-shaped, and has a floor 82 that is horizontally-oriented for fixedly mounting to the dashboard 29 of the boat 27, and a pair of side walls 84 that extend vertically upwardly from the floor 82 thereof, to terminal ends 86.

The housing 72 of the digital counter/readout display 30 is pivotally mounted in the bracket 80 of the digital counter/readout display 30, by a pair of thumb screws 88 that enter into the terminal ends 86 of the pair of side walls 84 of the bracket 80 of the digital counter/readout display 30, respectively, and into the air of side walls 78 of the housing 72 of the digital counter/readout display 30, respectively.

The digital counter/readout display 30 further comprises a digital display 90 that is disposed centrally on the face plate 74 of the housing 72 thereof.

The digital counter/readout display 30 further comprises an automatic sleep mode/wake button 92 that is disposed on the face plate 74 of the housing 72 thereof, to one side of the digital display 90 thereof.

The digital counter/readout display 30 further comprises a power/reset ganged button 94 that is disposed on the face plate 74 of the housing 72 thereof, to the other side of the digital display 90 thereof.

The digital counter/readout display 30 further comprises a fuse 96 that is disposed centrally on the rear wall 76 of the housing 72 thereof.

The digital counter/readout display 30 further comprises a power jack 98 that is disposed on the rear wall 76 of the housing 72 thereof, to one side of the fuse 96 thereof, for electrically communicating with the power supply 31 of the boat 27.

The digital counter/readout display 30 further comprises a data jack 100 that is disposed on the rear wall 76 of the housing 72 thereof, to the other side of the fuse 96 thereof, and receives the cable 66 from the detector/pulse module 28.

As shown in FIG. 11, the device further comprises a metal detector circuit 102 that is in electrical communication with the metal detecting coils 48.

The metal detector circuit 102 comprises a tuner circuit 104 that is in electrical communication with the metal detecting coils 48.

The metal detector circuit 102 further comprises an amplifier pulse shaper 106 that is in electrical communication with the tuner circuit 104.

The device further comprises a counter circuit 108 that is in electrical communication with the metal detector circuit 102.

The counter circuit 108 comprises a pulse counter 110 that is in electrical communication with the amplifier pulse shaper 106 of the metal detector circuit 102 and the reset portion of the power/reset ganged button 94, and for electrically communicating with the up/down anchor switch 33 of the boat 27.

The counter circuit 108 further comprises a filtered regulator power supply 112 that is in electrical communication with the power portion of the power/reset ganged button 94 and for electrically communicating with the power supply 31 of the boat 27.

The filtered regulator power supply 112 has a 12V output 114 that is in electrical communication with the tuner circuit 104 and the amplifier pulse shaper 106, and a 5V output 116.

The counter circuit 108 further comprises a decoder driver 118 that is in electrical communication with the 5V output 116 of the filtered regulator power supply 112, the digital display 90 of the digital counter/readout display 30, and the pulse counter 110.

The counter circuit 108 further comprises a sleep timer 120 that is in electrical communication with the decoder driver 118.

Figure 12B:
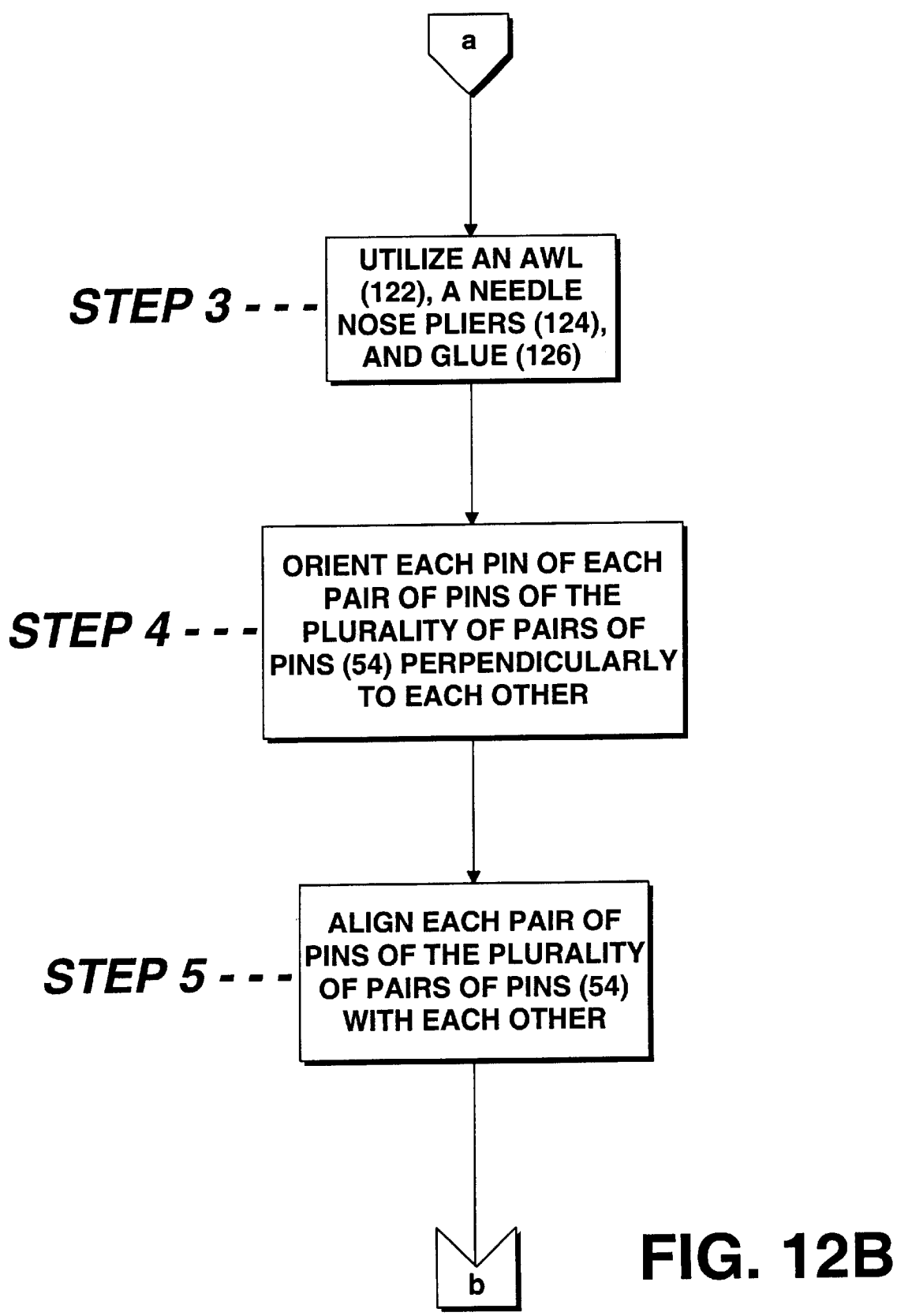
Figure 12C:
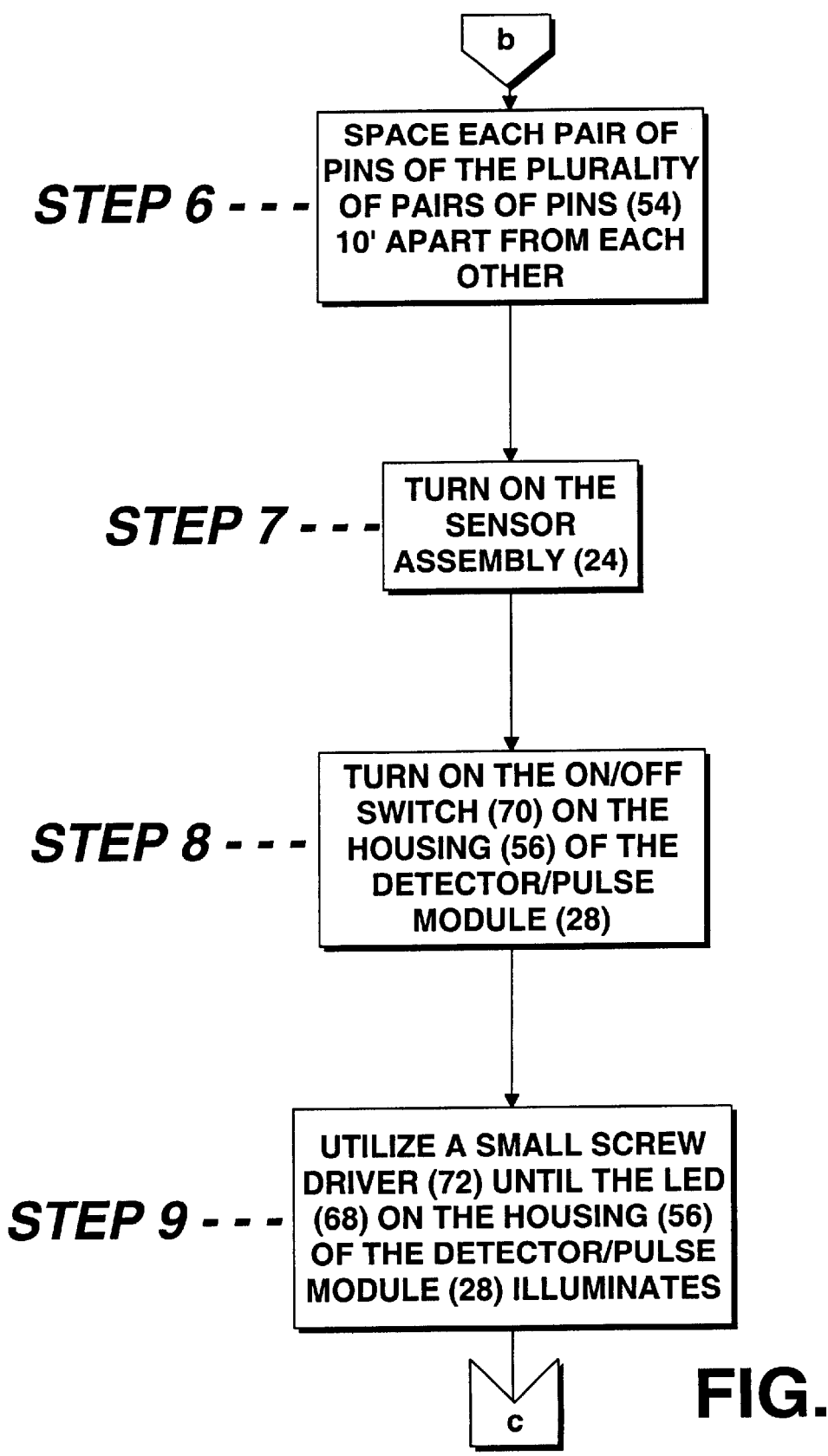
Figure 12D:
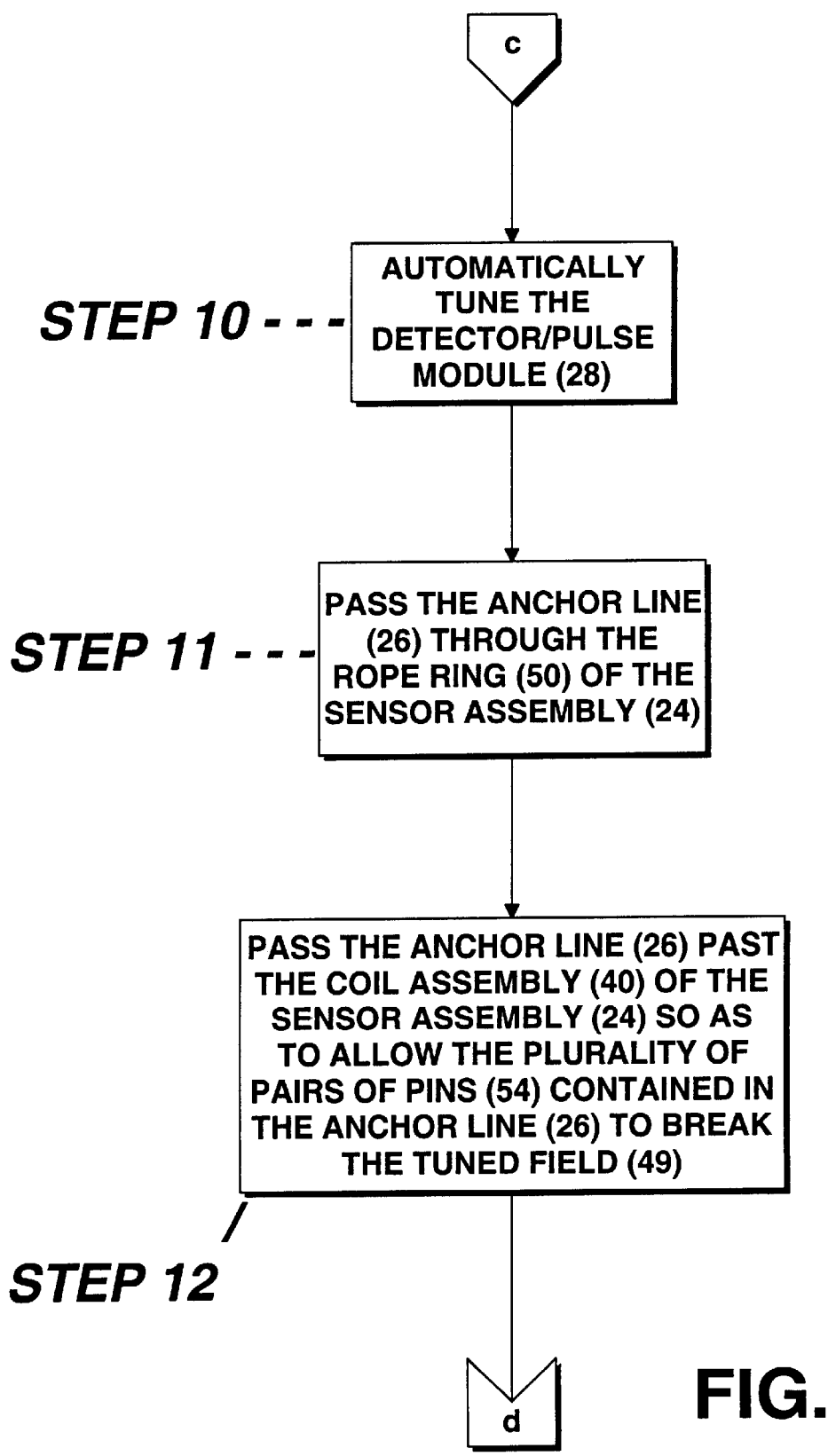
Figure 12E:
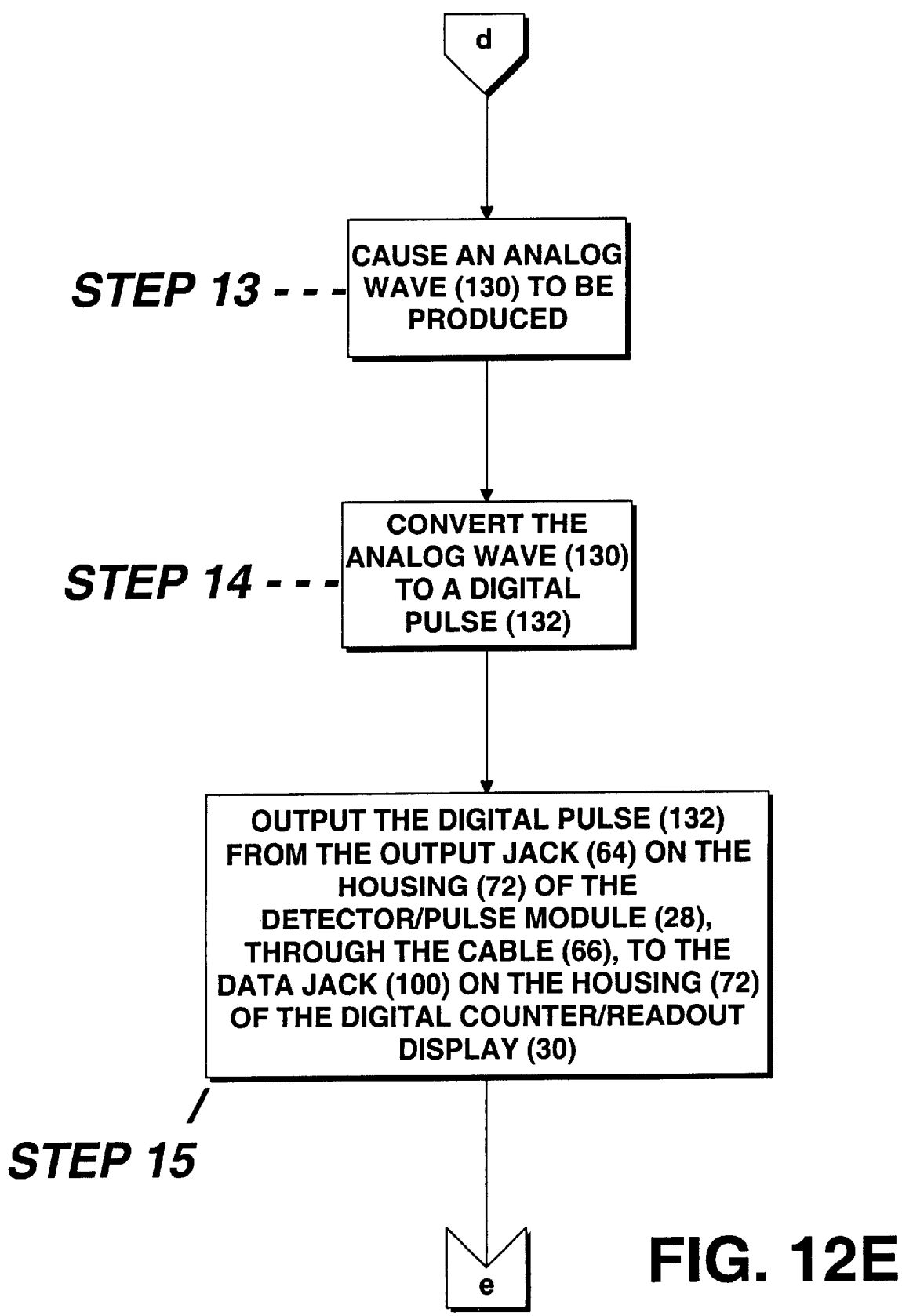
Figure 12F:
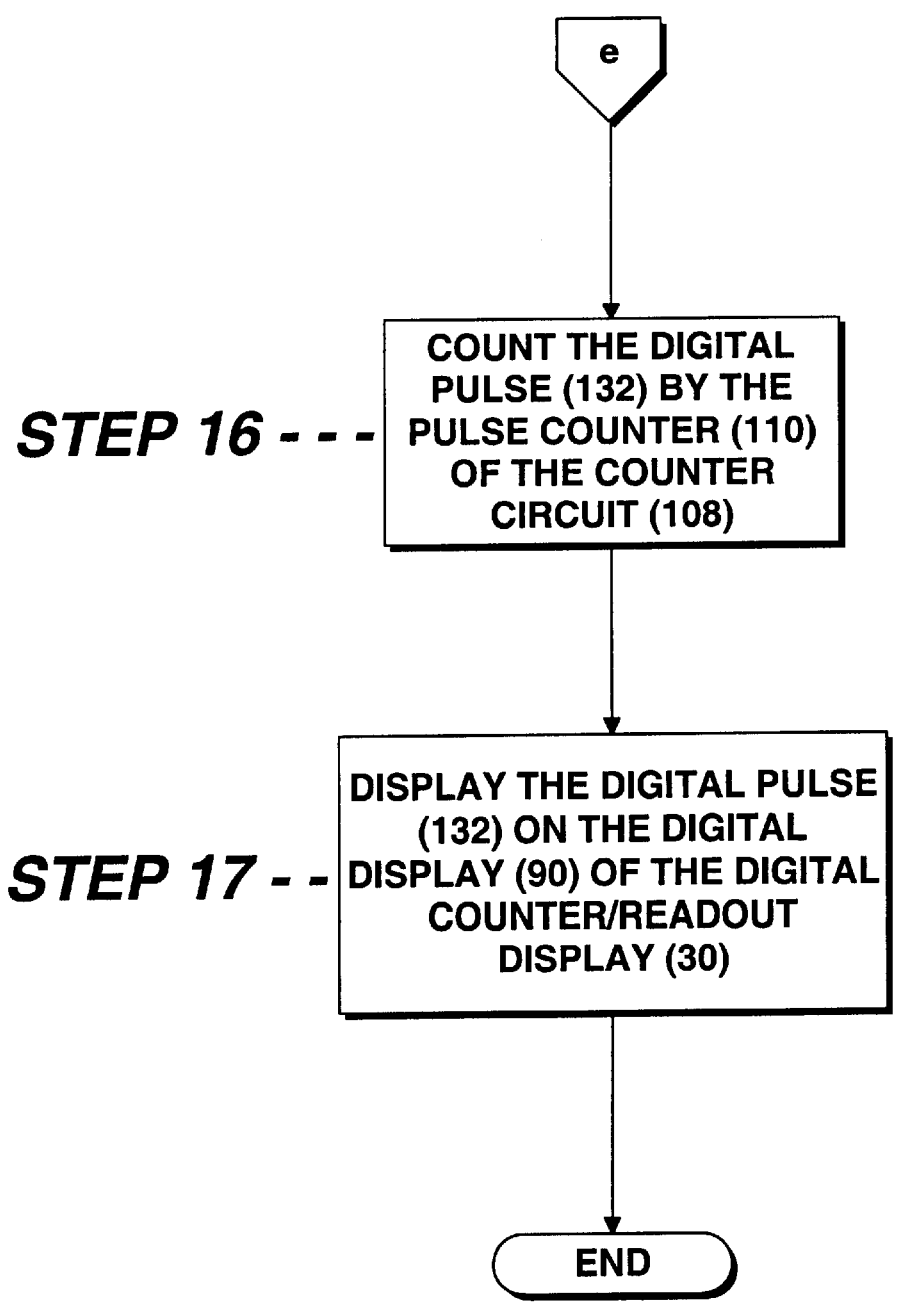

The method of using the device 20 can best be seen in FIGS. 12A–12F, and as such, will be discussed with reference thereto.

STEP 1: Fabricate the anchor line 26.
STEP 2: Insert the plurality of pairs of pins 54 diametrically into the anchor line 26.
STEP 3: Utilize an awl 122, a needle nose pliers 124, and glue 126.
STEP 4: Orient each pin of each pair of pins of the plurality of pairs of pins 54 perpendicularly to each other.
STEP 5: Align each pair of pins of the plurality of pairs of pins 54 with each other.
STEP 6: Space each pair of pins of the plurality of pairs of pins 54 10' apart from each other.
STEP 7: Turn on the sensor assembly 24.
STEP 8: Turn on the on/off switch 70 on the housing 56 of the detector/pulse module 28.
STEP 9: Utilize a small screw driver 72 until the led 68 on the housing 56 of the detector/pulse module 28 illuminates.
STEP 10: Automatically tune the detector/pulse module 28.
STEP 11: Pass the anchor line 26 through the rope ring 50 of the sensor assembly 24.
STEP 12: Pass the anchor line 26 past the coil assembly 40 of the sensor assembly 24 so as to allow the plurality of pairs of pins 54 contained in the anchor line 26 to break the tuned field 49.
STEP 13: Cause an analog wave 130 to be produced.
STEP 14: Convert the analog wave 130 to a digital pulse 132.
STEP 15: Output the digital pulse 132 from the output jack 64 on the housing 72 of the detector/pulse module 28, through the cable 66, to the data jack 100 on the housing 72 of the digital counter/readout display 30.
STEP 16: Count the digital pulse 132 by the pulse counter 110 of the counter circuit 108.
STEP 17: Display the digital pulse 132 on the digital display 90 of the digital counter/readout display 30.

It will be understood that each of the elements described above, or two or more together, may also find a useful application in other types of constructions differing from the types described above.

While the invention has been illustrated and described as embodied in a device for determining amount of deployment of an anchor from a rope compartment having an anchor line through hole, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A device for determining amount of deployment of an anchor from a rope compartment having an anchor line through hole on a boat having a dashboard, a power supply, and an up/down anchor switch in electrical communication with the power supply, said device comprising:

A) a sensor assembly;

B) an anchor line operatively cooperating with said sensor assembly for attaching to the anchor;

C) a detector/pulse module electrically communicating with said sensor assembly; and D) a digital counter/readout display electrically communicating with said detector/pulse module, wherein said sensor assembly comprises a bracket for fixedly attaching in the rope compartment, directly under the anchor line through hole, wherein said bracket of said sensor assembly is L-shaped, and has:

a) a first portion for depending vertically into the rope compartment, directly under the anchor line through hole; and b) a second portion that extends forwardly and horizontally from said first portion thereof, to a terminal end.

2. The device as defined in claim 1, wherein said sensor assembly further comprises a coil assembly that includes a plate that is vertically-oriented, disk-shaped, contains metal detecting coils that are concentrically disposed therein and generate a tuned field, and has:

a) a rearwardly-facing surface; and b) a forwardly-facing surface.

3. The device as defined in claim 2, wherein said rearwardly-facing surface of said plate is disposed centrally on said terminal end of said horizontal portion of said bracket of said sensor assembly, and is oriented perpendicular thereto.

4. The device as defined in claim 2, wherein said sensor assembly further comprises a rope ring that is a horizontally-oriented band that extends diametrically across said forwardly-facing surface of said plate, and has only ends affixed thereto so as to allow said anchor line to be fed vertically and freely therethrough.

5. The device as defined in claim 1, wherein said anchor line contains a plurality of pairs of pins that are spaced 10' apart from each other, are in alignment with each other, and cooperate with said metal detecting coils of said sensor assembly.

6. The device as defined in claim 5, wherein each pin of each pair of pins is perpendicularly crossed to each other, engage each other, and extend diametrically in said anchor line.

7. The device as defined in claim 5, wherein each pin of each pair of pins is made of a fine ferric material.

8. The device as defined in claim 5, wherein each pin of each pair of pins is made of a fine gold.

9. The device as defined in claim 2, wherein said detector/pulse module has a housing with a pair of tabs for mounting in the rope compartment, in proximity to said sensor assembly.

10. The device as defined in claim 9, wherein said detector/pulse module has an input jack that is mounted on said housing thereof, and is in electrical communication with said sensor assembly, by a coiled cord.

11. The device as defined in claim 9, wherein said detector/pulse module has an output jack that is mounted on said housing thereof, and is in electrical communication with said digital counter/readout display, by a cable for carrying power in and pulses out.

12. The device as defined in claim 9, wherein said detector/pulse module has an LED that is mounted on said housing thereof.

13. The device as defined in claim 12, wherein said detector/pulse module further has an on/off switch that is mounted on said housing thereof, and is in electrical with said LED for being activated by being turned by a small screw driver until said LED illuminates.

14. The device as defined in claim 11, wherein said digital counter/readout display comprises a housing that has:

a) a face plate;

b) a rear wall; and c) a pair of side walls.

15. The device as defined in claim 14, wherein said digital counter/readout display further comprises a bracket for fixedly mounting to the dashboard of the boat.

16. The device as defined in claim 15, wherein said bracket of said digital counter/readout display is U-shaped, and has:

a) a floor that is horizontally-oriented for fixedly mounting to the dashboard of the boat; and b) a pair of side walls that extend vertically upwardly from said floor thereof, to terminal ends.

17. The device as defined in claim 16, wherein said housing of said digital counter/readout display is pivotally mounted in said bracket of said digital counter/readout display, by a pair of thumb screws that enter into said terminal ends of said pair of side walls of said bracket of said digital counter/readout display, respectively, and into said pair of side walls of said housing of said digital counter/readout display, respectively.

18. The device as defined in claim 14, wherein said digital counter/readout display further comprises a digital display that is disposed centrally on said face plate of said housing thereof.

19. The device as defined in claim 18, wherein said digital counter/readout display further comprises an automatic sleep mode/wake button that is disposed on said face plate of said housing thereof, to one side of said digital display thereof.

20. The device as defined in claim 19, wherein said digital counter/readout display further comprises a power/reset ganged button that is disposed on said face plate of said housing thereof, to the other side of said digital display thereof.

21. The device as defined in claim 14, wherein said digital counter/readout display further comprises a fuse that is disposed centrally on said rear wall of said housing thereof.

22. The device as defined in claim 21, wherein said digital counter/readout display further comprises a power jack that is disposed on said rear wall of said housing thereof, to one side of said fuse thereof, for electrically communicating with the power supply of the boat.

23. The device as defined in claim 22, wherein said digital counter/readout display further comprises a data jack that is disposed on said rear wall of said housing thereof, to the other side of said fuse thereof, and receives said cable from said detector/pulse module.

24. The device as defined in claim 20; further comprising a metal detector circuit electrically communicating with said metal detecting coils.

25. The device as defined in claim 24, wherein said metal detector circuit comprises a tuner circuit that is in electrical communication with said metal detecting coils.

26. The device as defined in claim 25, wherein said metal detector circuit further comprises an amplifier pulse shaper that is in electrical communication with said tuner circuit.

27. The device as defined in claim 26; further comprising a counter circuit electrically communicating with said metal detector circuit.

28. The device as defined in claim 27, wherein said counter circuit comprises a pulse counter that is in electrical communication with said amplifier pulse shaper of said metal detector circuit and said reset portion of said power/reset ganged button, and for electrically communicating with the up/down anchor switch of the boat.

29. The device as defined in claim 28, wherein said counter circuit further comprises a filtered regulator power supply that is in electrical communication with said power portion said power/reset ganged button, and for electrically communicating with the power supply of the boat.

30. The device as defined in claim 29, wherein said filtered regulator power supply has:
   a) a 12V output that is in electrical communication with said tuner circuit and said amplifier pulse shaper; and
   b) a 5V output.

31. The device as defined in claim 30, wherein said counter circuit further comprises a decoder driver that is in electrical communication with said 5V output of said filtered regulator power supply, said digital display of said digital counter/readout display, and said pulse counter.

32. The device as defined in claim 31, wherein said counter circuit further comprises a sleep timer that is in electrical communication with said decoder driver.

33. A method of using a device for determining amount of deployment of an anchor, comprising the steps of:
   a) fabricating an anchor line of said device;
   b) inserting a plurality of pairs of pins of said device diametrically into said anchor line;
   c) spacing each pair of pins of said plurality of pairs of pins apart from each other;
   d) turning on a sensor assembly of said device;
   e) turning on an on/off switch on a housing of a detector/pulse module of said device;
   f) tuning automatically said detector/pulse module;
   g) passing said anchor line through a rope ring of said sensor assembly;
   h) passing said anchor line past a coil assembly of said sensor assembly so as to allow said plurality of pairs of pins contained in said anchor line to break a tuned field of said sensor assembly;
   i) causing an analog wave to be produced;
   j) converting said analog wave to a digital pulse;
   k) outputting said digital pulse from an output jack on said housing of said detector/pulse module, through a cable of said device, to a data jack on a housing of a digital counter/readout display of said device;
   l) counting said digital pulse by a pulse counter of a counter circuit of said device; and
   m) displaying said digital pulse on a digital display of said digital counter/readout display.

34. The method as defined in claim 33, wherein said step of inserting a plurality of pairs of pins of said device diametrically into said anchor line includes inserting a plurality of pairs of pins of said device diametrically into said anchor line by utilizing an awl, a needle nose pliers, and glue.

35. The method as defined in claim 33, wherein said step of inserting a plurality of pairs of pins of said device diametrically into said anchor line includes inserting a plurality of pairs of pins of said device diametrically into said anchor line so as to allow each pin of each pair of pins of said plurality of pairs of pins to be oriented perpendicularly to each other.

36. The method as defined in claim 33, wherein said step of inserting a plurality of pairs of pins of said device diametrically into said anchor line includes inserting a plurality of pairs of pins of said device diametrically into said anchor line so as to allow each pair of pins of said plurality of pairs of pins to be aligned with each other.

37. The method as defined in claim 33, wherein said step of spacing each pair of pins of said plurality of pairs of pins apart from each other includes spacing each pair of pins of said plurality of pairs of pins 10' apart from each other.

38. The method as defined in claim 33, wherein said step of turning on an on/off switch on a housing of a detector/pulse module of said device includes turning on an on/off switch on a housing of a detector/pulse module of said device by utilizing a small screw driver until an led on said housing of said detector/pulse module illuminates.

* * * * *